(12) United States Patent
Zerkle

(10) Patent No.: US 6,280,031 B1
(45) Date of Patent: Aug. 28, 2001

(54) PRISMATIC OPTICAL VIEWING GLASSES

(76) Inventor: Howard Zerkle, 3801 Langdale Dr., High point, NC (US) 27265

( * ) Notice: Subject to any disclaimer, the term of this patent is extended or adjusted under 35 U.S.C. 154(b) by 0 days.

(21) Appl. No.: 09/686,277

(22) Filed: Oct. 12, 2000

(51) Int. Cl.$^7$ ................................ G02B 1/00; G02B 3/00
(52) U.S. Cl. ......................... 351/158; 351/155; 359/482
(58) Field of Search .................................. 351/155, 158, 351/41; 2/10, 426; 359/482, 481, 480

(56) References Cited

U.S. PATENT DOCUMENTS

| | | |
|---|---|---|
| 2,123,682 | 7/1938 | Wingate . |
| 4,077,703 | 3/1978 | Pablo ................................... 350/145 |
| 4,647,165 | 3/1987 | Lewis ................................... 351/158 |
| 4,792,223 | 12/1988 | Axelbaum ............................ 351/158 |
| 4,804,261 | 2/1989 | Kirschen ............................. 351/158 |
| 5,042,910 | 8/1991 | Dolezal ................................ 359/480 |
| 5,173,720 | 12/1992 | Lee et al. ............................... 351/50 |
| 5,526,178 | * 6/1996 | Goldstein et al. ................... 359/407 |
| 6,006,367 | 12/1999 | Webster ................................ 2/430 |

* cited by examiner

Primary Examiner—Hung Xuan Dang
(74) Attorney, Agent, or Firm—Mills Law Firm PLLC

(57) ABSTRACT

Optical viewing glasses incorporate a visor positioned at the brow line or a wearer above the normal viewing field from which a pair of prisms depend without additional supporting structure thereby allowing the wearer to have a redirected field of vision while retaining peripheral viewing fields.

18 Claims, 2 Drawing Sheets

PRISMATIC OPTICAL VIEWING GLASSES

FIELD OF THE INVENTION

The present invention relates to optical devices, and, in particular to a viewing glasses incorporating optical prisms for redirecting a forward field of view.

BACKGROUND OF THE INVENTION

Optical devices for redirecting fields of view have been proposed for varying applications thereby enabling a wearer to access a viewing panorama offset from the normal line of sight. With such approaches, the wearer is able to secure desired views without changing body and head positions and/or by superimposing backgrounds for facilitating or ameliorating certain conditions.

In U.S. Pat. No. 5,042,910 to Dolezal a removable elongated plastic prism is interfaced with a slotted shield for redirecting the field of vision of the wearer. The shield and associated frame are intended for blocking all images not passing through the prismatic lenses. A tunnel vision is effected and peripheral viewing areas are blocked.

U.S. Pat. No. 4,804,261 to Kirschen discloses a rearward mirrored viewing system for patients prone to claustrophobia. Therein a mirror mounted on frames provides a rearwardly directed, background view at the end of a magnetic resonance instrument thereby providing an artificial backdrop removing the tunnel like aspects and resulting claustrophobia associated with the examination.

U.S. Pat. No. 4,647,165 to Lewis provides an optical viewing system for bike riders wherein prisms are attached to clip-on glass frames and pivot downward to an operative position engaging the lens when the riders head is lowered thereby providing a redirected view forwardly of the bike.

U.S. Pat. No. 4,792,223 to Axelbaum discloses an optical device incorporated into eyewear frames wherein a lower mirrored secondary lens supported in front of and inclined with respect to a primary lens is effective for providing a secondary field of view that is superimposed on a primary field of view.

U.S. Pat. No. 6,006,367 to Webster discloses swimming goggles incorporating a prismed element allowing a wearer through eye redirection to achieve a secondary field of vision. The supporting structure effectively removes peripheral sectors from the field of view.

U.S. Pat. No. 5,173,720 to Lee et al. discloses a specialty eyewear device including a slotted frame having mirrored surfaces angularly disposed with respect thereto. The wearer may view forwardly through the slots for normal straight ahead viewing. Alternatively, the wearer may view downwardly through the slots to achieve a redirected view as effected by the mirrored surfaces.

U.S. Pat. No. 4,077,703 to Pablo discloses an eyeframe incorporating prisms housed in an elongated frame overlying the wears face and disposed in front of the view's eyes for redirecting normal line of sight for reading or viewing. The apparatus blocks peripheral view and limits viewing to prism transmitted images.

U.S. Pat. No. 2,123,682 to Wingate discloses laterally slidable prisms mounted in eyewear frames for redirecting normal vision angles. The frames and peripheral shrouds for the prisms surround the prisms thereby effectively limiting frontal viewing to the prismed areas and to the exclusion of surrounding peripheral information.

Accordingly, it is an object of the present to provide optical viewing glasses incorporating prisms for redirecting a field of view without a loss of peripheral vision.

Another object of the invention is to provide prism viewing glasses for independent wearing or for use in conjunction with conventional eyeglasses.

A further objects of the invention is to provide prism viewing glasses wherein the prisms are attached to a visor above the normal visual vertical cutoff for view disposition without supporting framework in the normal field of view.

Yet another object of the invention is to provide optical viewing glasses having a pair of prisms supported outside the normal field of view allowing the wearer to achieve a focal redirected field of view without a sacrifice in peripheral visual information.

SUMMARY OF THE INVENTION

The foregoing objects are accomplished by optical viewing glasses having a visor supported on the wearer at the brow line and normal thereto so as not to be visible in a normal forwardly directed vision path. A pair of triangular optical prisms depend downwardly from the bottom surface of the visor in front of the wearer's eyes. The prisms provide an internally reflected and refracted path normal to the forward vision allowing the wearer to view scenes without head or body reorientation, such as watching television from a supine position. Lateral hinged temples are provided above the visor so as not to detract from peripheral vision and to enable the optical viewing glasses to be worn over conventional glasses. By interposing only the prisms in the field of view, to the exclusion of support structure, the wear may obtain a desired redirected field of view without a loss of visual information on surroundings and conditions in the peripheral areas.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
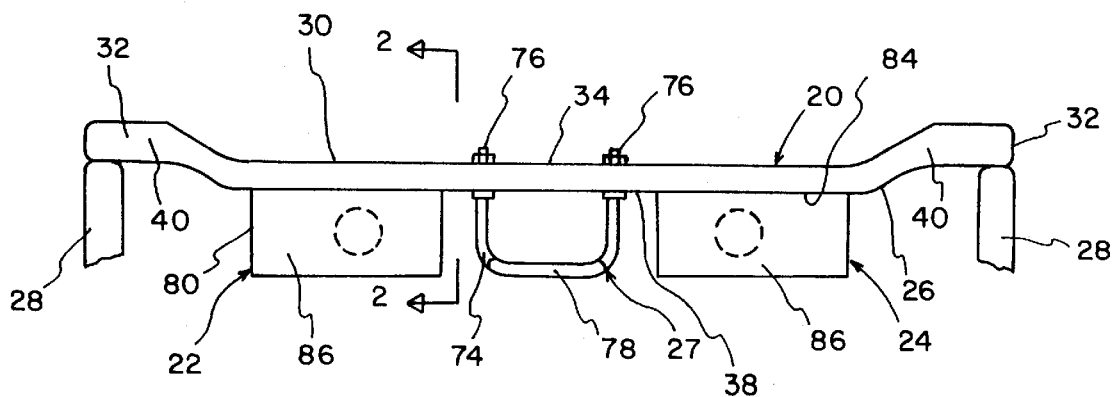
FIG. 1 is a front elevational view of optical glasses for providing a wearer with a redirected field of view in accordance with a preferred embodiment.
Figure 2:
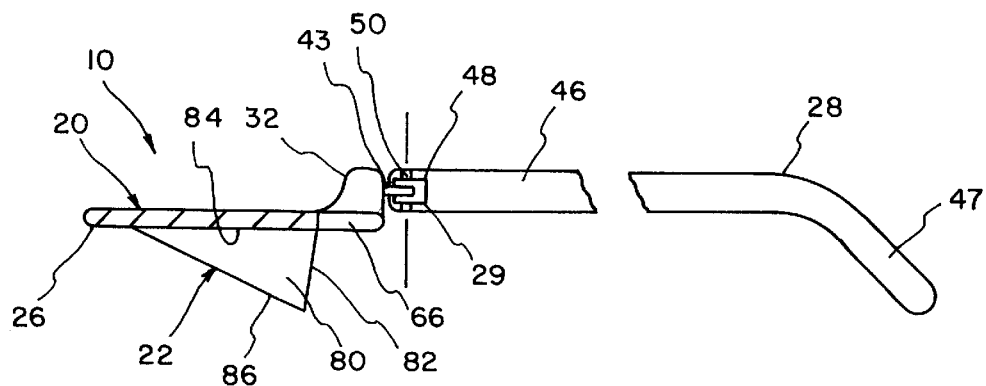
FIG. 2 is a side cross sectional view taken along line 2—2 in FIG. 1.
Figure 3:
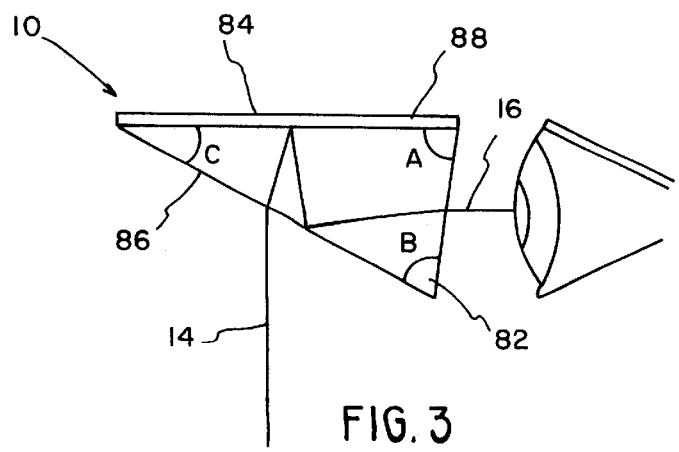
FIG. 3 is a vertical schematic view of the redirected field of view provided by the optical glasses of FIG. 1.

Referring to the drawings for the purpose of describing the preferred embodiment, FIGS. 1 through 3 illustrate prismatic optical glasses 10 worn by a user 12 for receiving a redirected line of sight 14 from a normal forward and straight ahead viewing path 16. As will become hereinafter apparent, such a redirected line of sight allows the user to engage in various viewing activities otherwise requiring body or head repositioning. Representative activities include viewing television from a supine position on a bed, reclining chair or the like, downward directed activities such as reading, typing or the like. Concurrently, with the features of the present invention, the user is also able to retain sensory visual feeling of surroundings through extensive peripheral areas that are not obstructed by visually apparent supporting framework.

Figure 4:
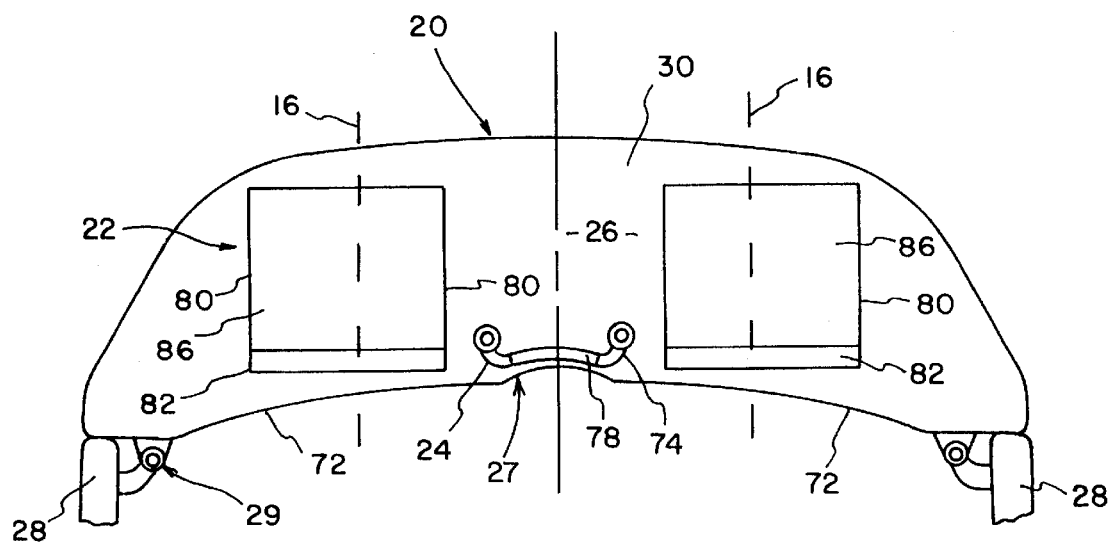
FIG. 4 is a bottom view of the optical glasses.
Figure 5:
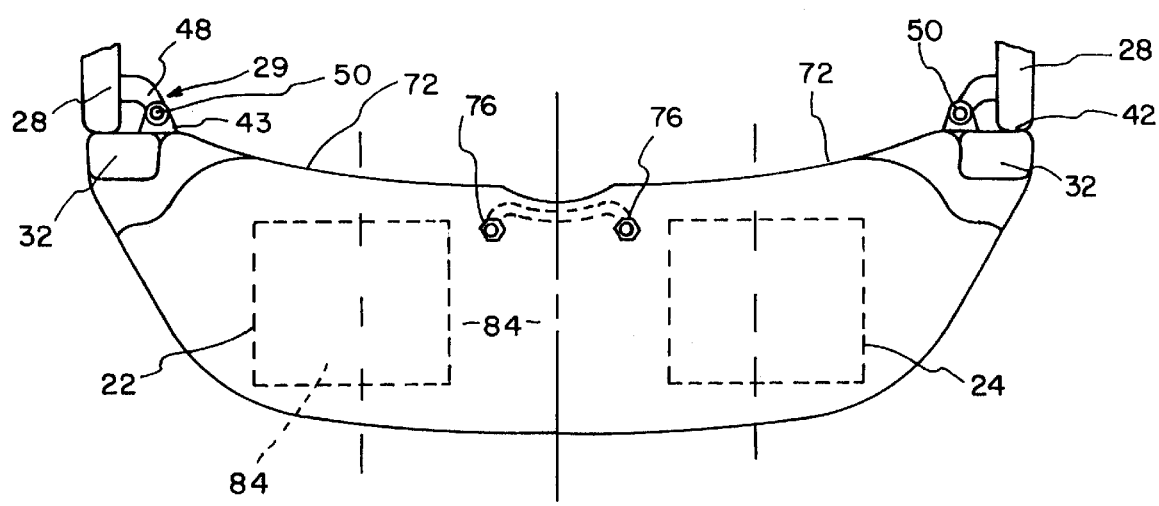
FIG. 5 is a top view of the optical glasses.

Referring additionally to FIGS. 4 and 5, the glasses 10 comprise a frontal, horizontal visor 20, a pair of laterally spaced prismatic elements 22, 24 depending downwardly from the lower surface 26 of the visor 20, a nose piece 27 connected to the visor 20 between the prismatic elements, and a pair of laterally spaced rearwardly extending temples 28 attached by hinges 29 at the rear lateral corners of the visor. As with conventional eyewear, the glasses 10 are supported on the user by the temples 28 engaging the temple and ear areas of the user, and the nose piece 27 engaging the bridge of the nose of the user.

The visor 20 is formed of an opaque, rigid plastic material and comprises a planar body 30 having upwardly enlarged bosses 32 at the outer rearward corners thereof. The top surface 34 is generally planar and merges with the adjacent bosses 32. The lower surface 26 includes a planar central section 38, parallel to the top surface 34, outwardly terminating with upwardly flared end sections 40. The rearward end surface 42 of the bosses 32 is substantially planar and transverse to the visor 20. A hinge section 43 of the hinge 29 is mechanically connected at the end surface 42 of the enlarged bosses 32.

The temples 28 are conventional in eyewear construction and include elongate horizontally extending arms 46 terminating with downwardly curved ends 47 for engagement with the ear area of the user. The inner frontal end of the arm includes a hinge section 48 for the hinge 29. The hinge sections are pivotally interconnected by pin 50 for pivotal movement about a vertical axis between the illustrated wearing position and a collapsed position wherein the temples abut the rear wall of the visor.

The front wall of the visor 20 comprises a straight center section 60 outwardly terminating with rounded side wall 62 blending with the bosses 32 and substantially coextensive with the flared portions 40 of the lower surface 26. Such a frontal profile limits distracting peripheral vision obstruction by the visor, both laterally and upwardly.

The rear wall of the visor comprises a recessed center portion registering with the nose of the wearer, laterally extending curved sections 72 conformal with the brow of the wear and terminating at the enlarged bosses 32.

The nose piece 27 includes an L-shaped support arms 74 symmetrically disposed at the center of the visor adjacent the rear wall. The arms terminate with an end loop connected at the lower surface of the visor by fasteners 76. A curved, padded cross member 78 interconnects the support arms and engages the nose of the user.

The prisms 22, 24 are symmetrically disposed on the planar center section of the lower surface. The elements are formed or optical grade glass or plastic and pentahedral in shape as defined by triangular, parallel end walls 80, a vertical end wall 82, a horizontal mounting wall 84 and a frontal inclined wall 86. The horizontal mounting wall 84 is adhered to the lower surface 26 by a suitable adhesive. The prisms are mounted and sized such that the eyes of the wearer are centered on the end wall 82 for normal straight forward vision. The visor and the temples are positioned at the normal vertical cutoff and thus disposed outwardly of the field of view. Such disposition also allows the glasses to be conveniently worn over conventional glasses. The lower edge of the walls 82 is accordingly at the lower portion of the eye thereby providing, with only minor downward eye movement, substantial forward and lateral vision exterior of the prisms. The width of the wall is substantially the width of the eye whereby substantial peripheral vision is afforded in conjunction with prismatic viewing. The prisms are spaced sufficiently close together to provide continuous binocular viewing without blind spots or other discontinuities.

The prisms function in a well known manner to reflecting and refracting images as indicated in FIG. 3. In the present invention, the end walls 80 are non-reflective and generally translucent. Frosted surfaces are preferred inasmuch as secondary images are not transmitted and discernable visible information is not presented by the coating. The end wall 82 is a clear polished surface and is located in the user's direct line-of-sight. The horizontal mounting wall 84 has a mirrored surface 88, preferably silvered or otherwise reflectively coated. The inclined wall 86 is a clear polished surface and receives the images reflected by the surface 88 for internal reflection to the front wall surface and refraction to the user. It will be appreciated that the prisms are effective for providing a redirected field of vision 14, substantially normal to the line-of-sight 16, as prescribed by the angularities between the prism walls. Various angularities may be adopted for accomplishing the foregoing. In the present invention, a substantially perpendicular redirection is preferred with the angles for achieving same being 70° to 90° for angle A, 60° to 80° for angle B and 20° to 35° for angle C, with 90° for angle A. 67.50° for angle B, and 22.50° for angle C being preferred. Additionally, the prisms were located symmetrically on the centerline at 1.2 inch spacing, a length of 1.2 inch, and a base wall 86 of 1.1 inch.

With the foregoing construction, the visor 20 and the depending prisms are effective for providing the redirected view. By locating all visible structural elements above the upper wall 86, and thus above the vertical visual cutoff, the remaining lateral and downward peripheral vision sectors are substantially unimpeded thereby avoiding a tunnel vision effect and allowing the user to carry on related activities with clear reference to surroundings.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. An optical eyewear for providing a wearer with a redirected field of vision when the wearer assumes a normal frontal viewing line of sight, said optical eyewear comprising:

an eyewear frame including having a rigid opaque planar visor with a pair of laterally spaced temples hingedly connected to and extending rearwardly thereof for supporting the visor on the wearer with said visor extending substantially parallel to and above said normal viewing line of sight with a lower planar surface of said visor substantially normal to the face of the wearer;

a pair of prismatic elements connected to said lower planar surface of said visor in laterally spaced relationship in front of each eye of said wearer, each of said prismatic elements having an optically clear rectangular vertical surface facing said wearer, a rectangular horizontal surface with a reflective coating at said lower surface of said visor, and a rectangular optically clear inclined surface interconnecting said horizontal surface and said vertical surface, the angularity between said surfaces of said prismatic elements and the optical characteristics thereof being such that images in the redirected line of sight are reflected at said horizontal surface, internally reflected at said inclined surface and refracted at said vertical surface to the eyes of the wearer thereby providing a redirected view normal to said line of vision, the adjacent inner side surfaces of said prismatic elements being translucent and sufficiently closely spaced to provide a continuous lateral field, the outer side surfaces being sufficiently closely spaced to provide unobstructed lateral peripheral vision, and the lower edge of the vertical surface terminating slightly below said binocular view field thereby providing unobstructed lower peripheral vision sectors whereby the wearer may achieve the redirected line of sight without loss of sensory aspects of normal peripheral vision.

2. The optical eyewear as recited in claim 1 wherein said horizontal surface of said prismatic element is adhesively attached to said lower planar surface of said visor.

3. The optical eyewear as recited in claim 2 wherein said visor includes enlarged bosses at the rear lateral ends of said visors, and the frontal ends of said temples are pivotally connected at said bosses.

4. The optical eyewear as recited in claim 3 wherein said lower planar surface of said visor terminates with upwardly flared end sections connected with said bosses.

5. The optical eyewear as recited in claim 2 wherein a nose piece for engaging the nose of the wears is connected to said lower planar surface between said prismatic elements.

6. The optical eyewear as recited in claim 5 wherein said nose piece includes a curved padded member space from a parallel to said lower planar surface for engaging said nose of said wearer.

7. A prismatic view device, comprising: elongated substantially planar visor means; support means connected to said visor means for supporting said visor at the brow line of a wearer and parallel to a forward line of sight; a pair of optical prisms connected to a bottom surface of said visor means and freely depending in front of the eyes of the wearer within the forward line of sight, said prisms being effective for redirecting said forward line of sight downwardly with respect, to said wearer to provide a redirected line of sight normal to the wearer.

8. The prismatic eyewear as recited in claim 7 wherein said prisms are triangular in cross section.

9. The prismatic eyewear as recited in claim 8 wherein said prisms have optically clear viewing surfaces adjacent said wearer and normal to said visor means.

10. The prismatic eyewear as recited in claim 9 wherein said prisms have optically translucent inner end surfaces and outer end surfaces.

11. The prismatic eyewear as recited in claim 10 wherein said end surfaces are optically frosted.

12. The prismatic eyewear as recited in claim 11 wherein a nose piece is connected to said visor means intermediate said inner end surfaces of said prisms and below said visor means.

13. The prismatic eyewear as recited in claim 12 wherein said nose piece is padded for engagement with the nose area of the wearer.

14. The prismatic eyewear as recited in claim 10 wherein the surface of said visor means adjacent said wearer is conformally curved to fit against the brow of the wearer.

15. The prismatic eyewear as recited in claim 10 wherein said prisms are frontally coextensive with the eyes of the wearer thereby providing outwardly thereof unobstructed peripheral viewing areas.

16. Prismatic optical viewing glasses for providing a wearer with a redirected field of vision from a forward line of sight, comprising:

an eyewear frame including having an opaque planar visor;

a pair of laterally spaced temples hingedly connected to and extending rearwardly of said visor for supporting said visor substantially parallel to and above said forward line of sight substantially normal to the face of the wearer;

a pair of triangular optical prisms connected to said lower planer surface of said visor in laterally spaced relationship in front of each eye of said wearer, said prisms having an optically clear vertical surface facing said wearer, a reflective horizontal surface with at said lower surface of said visor, and an optically clear inclined surface interconnecting said horizontal surface and said vertical surface, said surfaces of said prisms and the optical characteristics thereof redirecting the line of sight normal to said line of vision, the adjacent inner side surfaces of said prisms being sufficiently closely spaced to provide a continuous lateral binocular field, the outer side surfaces being sufficiently closely spaced to provide unobstructed lateral peripheral vision, and the lower edge of the vertical surface terminating slightly below said binocular view field thereby providing unobstructed lower peripheral vision sector whereby the wearer may achieve the redirected line of sight without loss of sensory aspects of normal peripheral vision.

17. The prismatic optical viewing glasses as recited in claim 16 wherein said prisms are adhesively connected to said visor.

18. The prismatic optical viewing glasses as recited in claim 17 wherein said prisms are frontally coextensive with the eyes of the wearer.

* * * * *